L. W. CYRENIUS.
AMPULLAR CONTAINER FOR LIQUIDS OR SEMISOLIDS.
APPLICATION FILED JAN. 29, 1919. RENEWED MAR. 6, 1920.
1,434,531. Patented Nov. 7, 1922.
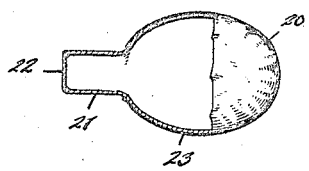
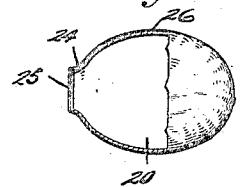
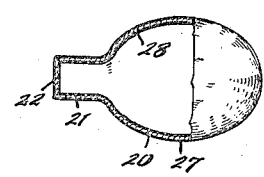
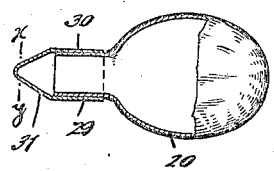
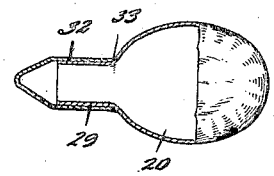
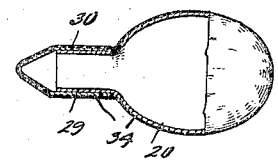
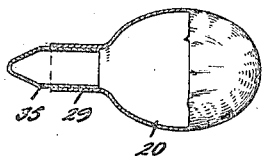
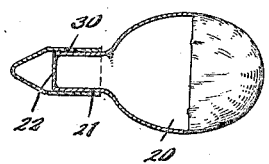
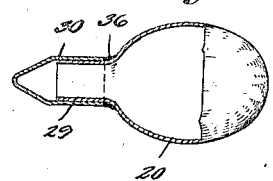
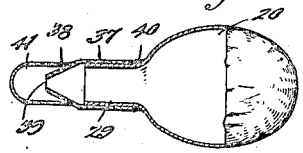
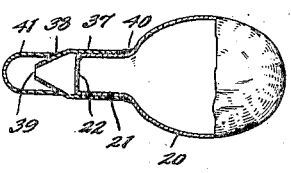
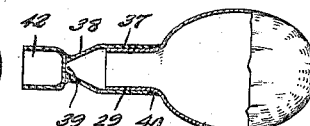
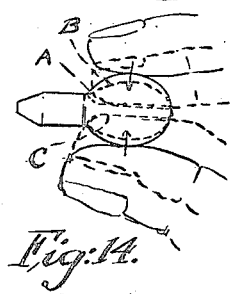
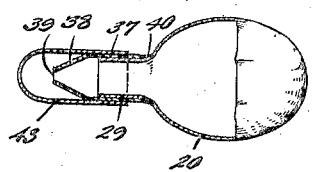
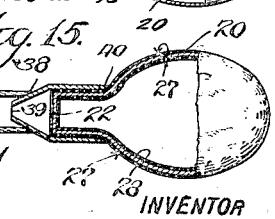
INVENTOR
Lloyd W. Cyrenius
BY C. P. Goepel
ATTORNEY Patented Nov. 7, 1922.

1,434,531

UNITED STATES PATENT OFFICE.

LLOYD W. CYRENIUS, OF NEW YORK, N. Y.

AMPULLAR CONTAINER FOR LIQUIDS OR SEMISOLIDS.

Application filed January 29, 1919, Serial No. 273,906. Renewed March 6, 1920. Serial No. 363,666.

*To all whom it may concern:*

Be it known that I, LLOYD W. CYRENIUS, a citizen of the United States, and resident of the borough of Manhattan, in the city, county, and State of New York, have invented certain new and useful Improvements in Ampullar Containers for Liquids or Semisolids, for which the following is a specification.

The present invention relates to improvements in ampullar containers for liquids or semi-solids particularly of a medicinal nature. For the most part containers for this purpose have heretofore been made of glass or other hard, stiff or non-compressible material and, while it is true that compressible containers have been used which were made of soft material such as soft metal as tin foil or lead foil, they had many disadvantages which rendered them unsuitable for use as containers for medicaments. These containers depended not upon elasticity in ejecting the contents but upon the pliable and inelastic nature of the metal and aside from their unsuitability for a great many substances the chemical constituents of which precluded their use, they were confined to use as containers for semi-solids, such for instance as oil paints, tooth paste, soap or the like. These metal containers were furthermore not capable of being manufactured in a shape suitable for containing liquid, as the pressure of liquid is such as distinguished from a semi-solid as to force open the seal or cause a break at any weak or wrinkled part of the container, and the elongated tubular shape is such that unless the container were pressed first at the closed end and gradually from the closed end toward the nozzle, the metal remaining in its collapsed position, the liquid would be captivated in a pocket at the closed end with the result that it could only be freed by pressure on the extended edges of the compressed portion of the container, in other words the contents could not be properly ejected by pressure against the body of the container but could only be forced out by compressing the container first adjacent the closed end, the same remaining compressed, thereby moving the body of the contents forward and out of the nozzle end, the interior capacity of the container being at all times equal to the contents. Obviously such a container would not be suitable for liquids as the liquid would always be under pressure at the nozzle or outlet end and leakage would be practically unavoidable.

Elongated compressible containers of any kind are objectionable when elongated to the extent that compression at an intermediate point will cause the compression movement of the contents in opposite directions from the point at which the container is pressed, and for this reason any elongated container when properly used must first be pressed at its end opposed to the outlet end as above pointed out and then as the contents are reduced the point to be pressed must be gradually toward the outlet end. In the case of a liquid, this makes uncertain the direction of the contents which is very important in applying medicines directly to wounds. Should such an elongated shape be used in connection with a container having elasticity, that is a container which will resume its shape after being compressed or a resilient container, it will prove unsuitable for both liquids and semi-solids and particularly the latter which will be drawn back into the container by the vacuum created upon expansion, especially as such a container would not permit of the ejection of substantially the entire contents by one or more applications of pressure at one point.

Glass containers had a number of disadvantageous features which rendered them unsatisfactory. In the first place they were fragile and as they had to be broken open to remove the contents there was the danger of cutting the fingers and getting splinters of glass into the medicaments. Also many medicines react chemically with the constituents of the glass so that in such cases the glass containers cannot be used. The inflexibility of glass also made difficult the removal of solids or semi-solids necessitating removal by melting and drawing into a hypodermic syringe or the like, which was intricate, time consuming and seldom removed the entire contents.

In the present invention I propose to provide an ampullar container, so designed, proportioned and constructed as to obviate the disadvantages of these prior types of containers so that beneficial uses and results are possible, and which will possess certain features and advantages which have never heretofore been contemplated in ampullar containers. To this end I propose as one embodiment to provide a container formed of a substance which is resiliently compressible and elastic and comprises a body portion and a nozzle or outlet portion, the body portion being such as to permit of the ejection of the entire contents under controllable pressure at one point, the lateral pressure applied being resolved into a propelling force moving the entire contents in one direction toward the nozzle. I further propose to provide a container which is at the same time a syringe or swab for the direct application of the medicament to the affected parts.

In order to provide a smooth, non-adherent, protective surface which will prevent deterioration from moisture or atmospheric heat, and which will render the containers capable of being treated with an antiseptic agent, sterile and resistant to dirt, germs, or the like and, on the other hand, insure the preservation of the contents of the container, I propose to coat the same either exteriorly, or exteriorly and interiorly, with a protective covering of a resilient, yielding, non-sticking, non-absorbent, impervious and non-porous substance. This occlusive coating shuts off the influences on the exterior of the container, prevents moisture from coming in, and being yieldable bends with the container in all directions following all the configurations given it by pressure applied and being co-resilient therewith. The occlusive and non-stickey coating renders the container impervious to moisture and makes relatively permanent the substance of the same, preventing it from softening and expanding in some climates or hardening and sprinkling in others.

The invention also comprises the improvements in the structures herewith described and intended to be claimed.

With these and other objects in view, embodiments of my invention are shown in the accompanying drawings and these embodiments will be hereinafter more fully described with reference thereto and the invention will be finally pointed out in the claims.

In the accompanying drawings:

Figure 1 is a view partly in elevation and partly in vertical section showing one embodiment of my invention having an extended sealed outlet end and having the body portion coated exteriorly;

Figure 2 is a similar view of a modified form having a reduced sealed outlet end and entirely coated exteriorly;

Figure 3 is another embodiment similar to the form shown in Figure 1 but entirely coated exteriorly and interiorly;

Figure 4 is a similar view of another embodiment having an open outlet end and a nozzle cap, the body portion being coated exteriorly;

Figure 5 is a similar view of a further embodiment having a nozzle cap sealed with relation to the container;

Figure 6 is a view of a further embodiment similar to the form shown in Figure 4 but entirely coated exteriorly;

Figure 7 is a similar view of another modification in which the removable nozzle cap is disposed interiorly of the extended outlet end;

Figure 8 is a similar view of another modification having a removable nozzle and closed outlet end;

Figure 9 is a similar view of a form in which the removable nozzle is sealed with relation to the container portion but with a different form of seal than that known in Figure 5;

Figure 10 is a similar view of a further modified form having a permanent open end nozzle and a removable closure cap;

Figure 11 is a similar view of a further modified form in which the outlet end of the container is closed, this form being otherwise similar to that shown in Figure 10;

Figures 12 and 13 are similar views of modifications in which the container and the permanent nozzle are similar to the nozzle shown in Figure 10 but have modified forms of closure caps;

Figure 14 shows the manner of compressing the container.

Fig. 15 is a view partly in elevation and partly in section, showing another modification of Fig. 11 with the inner and outer coatings applied thereto.

Similar reference characters indicate corresponding parts throughout the several figures of the drawings.

Referring to the drawings, the embodiment shown in Figure 1 comprises a body portion 20 substantially oval or egg-shaped, the outlet end being extended into an elongated cylindrical nozzle 21 closed as at 22, the entire structure, that is the body portion, the nozzle and the closure being formed of the same material and integral. The container in one embodiment may be formed of a gelatinous substance. It is compressible, slightly yielding and elastic and is covered up to the portion 21 with a protective coating 23 which penetrates into and intermingles with the gelatinous substance to render the surface resilient, yieldable, non-sticking, non-porous, resistant to dirt or germs and easy to render sterile. Such a substance may be formed by dissolving 50 grams of celluloid in 250 grams of acetone and 250 grams of amyl acetate. Other suitable substances may be used, if desired, having all or some of the above mentioned characteristics, and producing the same or similar results. This substance thoroughly protects the container against moisture, effects of atmospheric heat, shrinkage and wrinkling and is resilient, pliable and elastic with the movement of the gelatinous body without cracking. By mixing a pigment with the coating, the same may be made of any desired color so that certain substances may be distinguished by certain colors.

The container in the form in which I prefer to manufacture is so proportioned that it may be placed between the ends of the thumb and index finger as indicated in Figure 14, the opposed surfaces of the thumb and finger when brought toward each other in the direction of the arrows flattening the container and ejecting the contents, the thumb and finger surfaces being such as to engage the entire surface of the container when flattened, thereby removing the entire contents. As the intermediate portion does not become reduced relatively to the portion rearwardly thereof, the entire contents of the container are moved toward the outlet by the single application of pressure so that there is no danger of part of the contents being pocketed at the closed end. In Figure 14, the full lines A indicate the position before pressure, the dotted lines B an intermediate position, and the dotted lines C the final position. Upon release the container resumes the full line position A due to its inherent elasticity.

In the form of my invention shown in Figure 2, the body portion 20 is provided with a neck portion 24 and the closed end 25, the entire outer surface being covered with a protective coating 26.

In Figure 3 the body portion 20, the nozzle portion 21 and the closed end 22 are the same as the form shown in Figure 1 but in this embodiment the container is provided with an exterior coating 27 and an interior coating 28 extending over the entire exterior and interior surfaces.

When it is desired to remove the contents in any of these three forms, the closed outlet end may be opened by piercing the same or it may be cut off by means of a knife, and pressure applied to the body portion and the contents squirted or ejected out.

In Figure 4, I have illustrated an embodiment in which the cylindrical portion 29 is opened at its end and over the same there is provided a cylindrical nozzle cap 30 having a pointed syringe end 31. This nozzle cap is formed of a relatively hard gelatinous substance and is secured to the outlet nozzle 29 by wetting the same slightly so that the two gelatinous substances unite with each other, or it may be secured by a suitable cementitious substance. In order to open the container to eject the contents the pointed end of the cap may be pierced with a pin or it may be cut off with a knife along the line $x$—$y$, for instance. In this embodiment I have shown the body portion 20 as coated exteriorly up to the end of the cap 30.

In Figure 5, the cap 32 is similar to the cap 30 shown in Figure 4 and is shown secured to the body portion 20 by so wetting or heating the edge of the cap that the same may be pressed into the body portion as at 33 combining with the same to form a permanent seal in connection with the cap and the body portion.

The form shown in Figure 6 is similar to that shown in Figure 4, with the exception that the entire exterior surface of the complete container, that is the container with the cap 30 in place, is coated with a protective covering 34.

In Figure 7, a nozzle cap 35 having an exterior diameter equal to the interior diameter of the outlet portion 29 of the container is inserted in the said outlet portion 29 and may be held in place by any suitable means as before pointed out in the form shown in Figure 4.

Figure 8 represents a modification in which the body portion and outlet portion are similar to the form shown in Figure 1, the outlet portion being closed as at 22 and provided with a cap 30. With this form both the end of the cap and the closed end 22 of the container must be pierced or, if desired, the cap may be removed, in which case the closed end 22 may be opened in a manner similar to that described in reference to the form shown in Figure 1 and the cap thereupon replaced to form a syringe nozzle for the direct application of the contents to the place or in the direction desired.

The form shown in Figure 9 is similar to that shown in Figure 4 with the exception that the cap 30 is secured to the container by a sealing substance 36.

In the form shown in Figure 10 the nozzle cap 37 is provided upon the outlet portion 39 of the container the pointed portion 38 thereof being opened as at 39, the said nozzle cap being secured to the container by means of the sealing substance 40. A closure cap 41 is placed over the end of the nozzle cap so that the edge thereof may be pressed into the surface of the pointed end 38, both the nozzle cap and the closure cap being formed of a gelatinous substance which, when slightly moistened, will cause said caps to be joined together by the application of a slight pressure thereon and forming an air-tight seal. When it is desired to remove the closure cap 41 it is only necessary to break the same away from the nozzle cap which may be done with very little effort and, if all of the contents are not used and it is desired to close the same again, the closure cap may be compressed into place again by moistening the edges slightly as above pointed out.

The form shown in Figure 11 is similar to that shown in Figure 10 with the exception that the outlet end of the container is closed as at 22.

In Figure 12, I have illustrated a form in which the closure cap 42 is inverted with relation to that shown in Figure 10, the edge of the opened end of the nozzle cap being pressed into the closed end of the closure cap.

In Figure 13, I have illustrated a form in which the closure cap 43 is slidably engaged over the cylindrical surface of the nozzle cap 37.

In all of the forms of my invention it will be understood that the container may be coated both exteriorly and interiorly with a protective substance or the same may be only coated exteriorly, when it is to be used for substances which will not chemically react with the gelatinous substance from which the container is made.

The coating assures the preservation of the gelatine and also the preservation of the contents. The concrete mass of gelatine is covered by an occlusive coating shutting off influences on the exterior, and prevents moisture from coming in. Gelatine, being composed of glycerine, water and gelatine, it has an affinity for the celluloid solution by the acetone cooperating with the glycerine, and the capillary attraction existing, whereby a close binding together of the constituents of the bulb and the coating material takes place. A surface co-action results from the penetration or intermixture or intermingling, so that, on being compressed, the affinity between component parts is accentuated. The yieldy coating bends itself to the same configuration as the bulb and is co-resilient therewith, and at all times provides a protective coating.

This coating prevents the bulb from drying out or shrinking, prevents it from getting hard or soft, and prevents any leakage or dissipation of the contents, or the contents from being influenced by the causes exterior to the contents.

The ampullar container is specially adapted for local application directly to wounds, and may be used also in connection with the filling of hypodermic syringes. Special uses are for containing mercurials, medicated ointments, and the like, especially indicated for certain diseases.

I have illustrated preferred and satisfactory embodiments of my invention but it is obvious that changes may be made therein within the spirit and scope thereof as defined in the appended claims.

I claim:

1. An ampullar container for liquids or semisolids having a hollow body portion of flexible yieldable material, an outlet nipple forming an integral part therewith and of the same material to permit the outflow of the contents of the body portion, said body portion having a larger diameter than that of the outlet nipple, and having at its exterior a protective coating adapted to render the same non-sticking and flexible and resistant to contamination and atmospheric conditions.

2. An ampullar container for liquids or semisolids having a hollow body portion of flexible yieldable material, an outlet nipple forming an integral part therewith and of the same material to permit the outflow of the contents of the body portion, said body portion having a larger diameter than that of the outlet nipple, and having an interior coating adapted to render the same resistant to the action of the contents of said container.

3. An ampullar container for liquids or semisolids having a hollow body portion of flexible yieldable material, an outlet nipple forming an integral part therewith and of the same material to permit the outflow of the contents of the body portion, said body portion having a larger diameter than that of the outlet nipple, and a nozzle cap non-integral with said body portion and extending over the outlet nipple, and permanently secured in relation thereto and a removable closure cap adapted to close said nozzle cap.

4. An ampullar container for liquids or semisolids having a hollow body portion of flexible yieldable material, an outlet nipple forming an integral part therewith and of the same material to permit the outflow of the contents of the body portion, said body portion having a larger diameter than that of the outlet nipple, and a nozzle cap non-integral with said body portion and extending over the outlet nipple, and permanently secured in relation thereto and a removable closure cap adapted to close said nozzle cap, said nozzle cap and said closure cap being formed of gelatinous substance adapted upon being moistened to seal one to the other to form an air tight closure.

5. An ampullar container for liquids or semisolids having a hollow body portion of elastic yieldable material and an outlet nozzle to permit the outflow of the contents of the body portion, said body portion having a larger diameter than that of the outlet nozzle, said outlet nozzle being of relatively harder material than said body portion and having a tapering end to form a guiding nozzle.

6. An ampullar container for liquids or semi-solids having a hollow body portion of flexible yieldable material, an outlet nozzle to permit the outflow of the contents of the body portion, said body portion having larger diameter than that of the outlet nozzle, and having at its exterior a protective coating adapted to render the same non-sticking and flexible, and said body portion being of such size that its transverse and longitudinal dimensions may be disposed within the transverse and longitudinal dimensions of the end portion of the thumb and finger and adapted to be completely collapsed by pressure at one point to eject the contents.

7. An ampullar container for liquid or semi-solids having a hollow body portion or flexible yieldable material, the outlet nipple forming an integral part therewith and of the same material to permit the outflow of the contents of the body portion, having larger diameter than that of the outlet nipple, such outlet nipple adapted to enable ejection of the contents in a definite direction, said body portion having at its exterior a protective and occlusive coating adapted to render the same non-sticking and flexible and its contents resistant to contamination and climatic changes.

8. An ampullar container for medicinal substances, having a hollow body portion of flexible yieldable material adapted to contain a liquid or semi-solid, a closed outlet nipple forming an integral part therewith and of the same material, of extended shape and of smaller diameter than the diameter of the body portion and yieldable with the body portion, said body portion having at its exterior a substance to render the same occlusive and non-sticking, and to maintain the same flexible, occlusive and non-sticking within the ordinary extremes of temperature.

9. An ampullar container for liquids or semi-solids having a hollow body portion of flexible yieldable material, an outlet nipple forming an integral part therewith and of the same material to permit the outflow of the contents of the body portion, said body portion having a larger diameter than that of the outlet nipple and having at its exterior a protective coating composed of celluloid, acetone and amyl acetate.

10. An ampullar container for liquids or semi-solids having a hollow body portion of flexible yieldable material, an outlet nipple forming an integral part therewith and of the same material to permit the outflow of the contents of the body portion, said body portion having a larger diameter than that of the outlet nipple and having at its exterior a protective coating composed of celluloid, acetone and amyl acetate and on its interior with a protective coating.

11. An ampullar container for liquids or semi-solids having a hollow body portion of flexible yieldable material, an outlet nipple forming an integral part therewith and of the same material to permit the outflow of the contents of the body portion, said body portion having a larger diameter than that of the outlet nipple and having at its exterior a protective coating composed of celluloid, acetone and amyl actate and on its interior with a protective coating of the same composition.

12. An ampullar container for liquids or semi-solids having a hollow body portion of flexible yieldable material, an outlet nipple forming an integral part therewith and of the same material to permit the outflow of the contents of the body portion, said body portion having a larger diameter than that of the outlet nipple and having at its exterior a protective coating composed of celluloid, acetone and amyl acetate and a pigment.

13. A medicinal implement consisting of an ampullar container having a hollow body portion of flexible yieldable material, an outlet nipple forming an integral part therewith and of the same material to permit the outflow of the contents of the body portion, said body portion having a larger diameter than that of the outlet nipple, a medicament sealed within said container and a nozzle cap non-integral with said body portion and extending over said outlet nipple and sealed to said container.

14. An ampullar container for liquids or semi-solids having a hollow body portion of flexible yieldable material, and a hollow pointed outlet nozzle relatively stiffer than said body portion.

15. An ampullar container for liquids or semi-solids having a hollow body portion of flexible yieldable material, and a hollow pointed outlet nozzle of separate material than said body portion, relatively stiffer than said body portion, and sealed to said body portion.

16. An ampullar container for liquids and semi-solids having a hollow body portion of flexible yieldable material, and a hollow outlet nozzle, said body portion having a larger diameter than that of the outlet nozzle and the latter being relatively stiffer than said body portion.

17. An ampullar container for liquids and semi-solids having a hollow body portion of flexible yieldable gelatinous material and a hollow outlet nozzle of similar relatively harder material and being relatively stiffer than said body portion.

In testimony that he claims the foregoing as his invention, he has signed his name hereunder.

LLOYD W. CYRENIUS.